US011732790B2

(12) United States Patent
Hammond et al.

(10) Patent No.: US 11,732,790 B2
(45) Date of Patent: Aug. 22, 2023

(54) POWERTRAIN SYSTEM FOR AN ELECTRIC OR A HYBRID VEHICLE

(71) Applicant: FORD GLOBAL TECHNOLOGIES, LLC, Dearborn, MI (US)

(72) Inventors: Matthew David Hammond, Dearborn, MI (US); Gregory Daniel Goleski, Rochester Hills, MI (US); Bryant L. Poynter, Redford, MI (US); David Gon Oh, Canton, MI (US); Bhaskar Marathe, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 357 days.

(21) Appl. No.: 17/014,576

(22) Filed: Sep. 8, 2020

(65) Prior Publication Data

US 2022/0074477 A1    Mar. 10, 2022

(51) Int. Cl.
| | |
|---|---|
| *F16H 45/02* | (2006.01) |
| *B60K 6/26* | (2007.10) |
| *B60K 6/405* | (2007.10) |
| *B60K 6/485* | (2007.10) |
| *B60K 6/40* | (2007.10) |
| *B60K 6/42* | (2007.10) |
| *B60K 6/46* | (2007.10) |

(Continued)

(52) U.S. Cl.
CPC ............... *F16H 45/02* (2013.01); *B60K 6/26* (2013.01); *B60K 6/40* (2013.01); *B60K 6/405* (2013.01); *B60K 6/42* (2013.01); *B60K 6/46* (2013.01); *B60K 6/485* (2013.01); *B60K 2006/4825* (2013.01); *F16H 2045/002* (2013.01); *F16H 2045/021* (2013.01)

(58) Field of Classification Search
CPC ............... F16H 45/02; F16H 2045/002; F16H 2045/021; B60K 6/26; B60K 6/40; B60K 6/405; B60K 6/42; B60K 6/46; B60K 6/485; B60K 2006/4825
See application file for complete search history.

(56) References Cited

U.S. PATENT DOCUMENTS

| | | | |
|---|---|---|---|
| 7,509,802 B2 * | 3/2009 | Hammond | ............... B60K 6/26 60/330 |
| 10,792,991 B2 * | 10/2020 | Heeke | ..................... F16H 45/02 |

(Continued)

FOREIGN PATENT DOCUMENTS

WO    2019197104 A1    10/2019

*Primary Examiner* — John D Walters
(74) *Attorney, Agent, or Firm* — David B Kelley; Brooks Kushman P.C.

(57) ABSTRACT

A vehicle includes an engine, an electric machine, a torque converter, a weldment, an engine disconnect clutch, and a torque converter lockup clutch. The engine has a crankshaft. The electric machine has a rotor. The torque converter has an impeller and a turbine. The weldment is configured to rotate about an axis and to transfer power from the crankshaft and the rotor to the impeller. The weldment has a first hub, a second hub, a torque converter cover, an impeller housing, and a third hub. The engine disconnect clutch is configured to rotatably connect and disconnect the crankshaft to and from the weldment. The torque converter lockup clutch is configured to rotatably connect and disconnect the turbine to and from the weldment.

20 Claims, 4 Drawing Sheets

(51) Int. Cl.
  *B60K 6/48* (2007.10)
  *F16H 45/00* (2006.01)

(56) References Cited

U.S. PATENT DOCUMENTS 11,353,097 B2 * 6/2022 Rentfrow ................ F16D 25/10
2008/0072586 A1  3/2008 Hammond et al.

* cited by examiner

POWERTRAIN SYSTEM FOR AN ELECTRIC OR A HYBRID VEHICLE

TECHNICAL FIELD

The present disclosure relates to powertrain systems for electric and hybrid vehicles.

BACKGROUND

Hybrid and electric vehicles include powertrain systems that are configured transfer torque and power from one or more powerplants (e.g., an engine or an electric machine) to the wheels of the vehicle.

SUMMARY

A vehicle includes an engine, an electric machine, a torque converter, a weldment, an engine disconnect clutch, and a torque converter lockup clutch. The engine has a crankshaft. The electric machine has a rotor. The torque converter has an impeller and a turbine. The impeller and turbine each have blades. The weldment is configured to rotate about an axis and to transfer power from the crankshaft and the rotor to the impeller. The weldment has a first hub, a second hub, a torque converter cover, an impeller housing, and a third hub. The second hub is secured to the first hub and is disposed radially outward from the first hub relative to the axis. The second hub has first and second protrusions extending axially outward in opposing directions relative to the axis. The first and second protrusions define first and second sets of splines, respectively. The second protrusion defines a key. The torque converter cover is secured to the second hub and is disposed radially outward from the second hub relative to the axis. The impeller housing is secured to the torque converter cover, is disposed radially inward of the torque converter cover relative to the axis, and is disposed on an opposing side of the turbine blades relative to the second hub and torque converter cover. The impeller blades are secured to an internal surface of the impeller housing. The third hub is secured to the impeller housing, extends axially away from the torque converter cover relative to the axis, and is disposed on an opposing side of the turbine blades relative to the second hub. The engine disconnect clutch is configured to rotatably connect and disconnect the crankshaft to and from the weldment. The torque converter lockup clutch is configured to rotatably connect and disconnect the turbine to and from the weldment.

A vehicle powertrain includes a torque converter, an input shaft, a weldment, and an output shaft. The torque converter has an impeller and a turbine. The impeller and turbine each have blades. The weldment is configured to rotate about an axis and to transfer power from the input shaft to the impeller. The weldment has a hub, a torque converter cover, and an impeller housing. The hub has first and second protrusions extending axially outward in opposing directions relative to the axis. The first and second protrusions define first and second sets of splines, respectively. The torque converter cover is secured to the hub and is disposed radially outward from the hub relative to the axis. The impeller housing is secured to the torque converter cover, is disposed radially inward of the torque converter cover relative to the axis, and is disposed on an opposing side of the turbine blades relative to the hub and torque converter cover. The impeller blades are secured to an internal surface of the impeller housing. The output shaft is secured to the turbine.

A weldment for a vehicle powertrain system is configured to rotate about an axis and to transfer power to a torque converter. The torque converter has an impeller and a turbine. The weldment has a first hub, a torque converter cover, and an impeller housing. The first hub has first and second protrusions extending axially outward in opposing directions relative to the axis. The first and second protrusions define first and second sets of splines, respectively. The second protrusion defines a key. The first and second sets of splines are configured to engage first and second sets of friction plates. The key is configured to engage an electric machine rotor. The torque converter cover is secured to the first hub and is disposed radially outward from the first hub relative to the axis. The impeller housing is secured to the torque converter cover, is disposed radially inward of the torque converter cover relative to the axis, and is disposed on an opposing side of the turbine relative to the first hub and torque converter cover.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
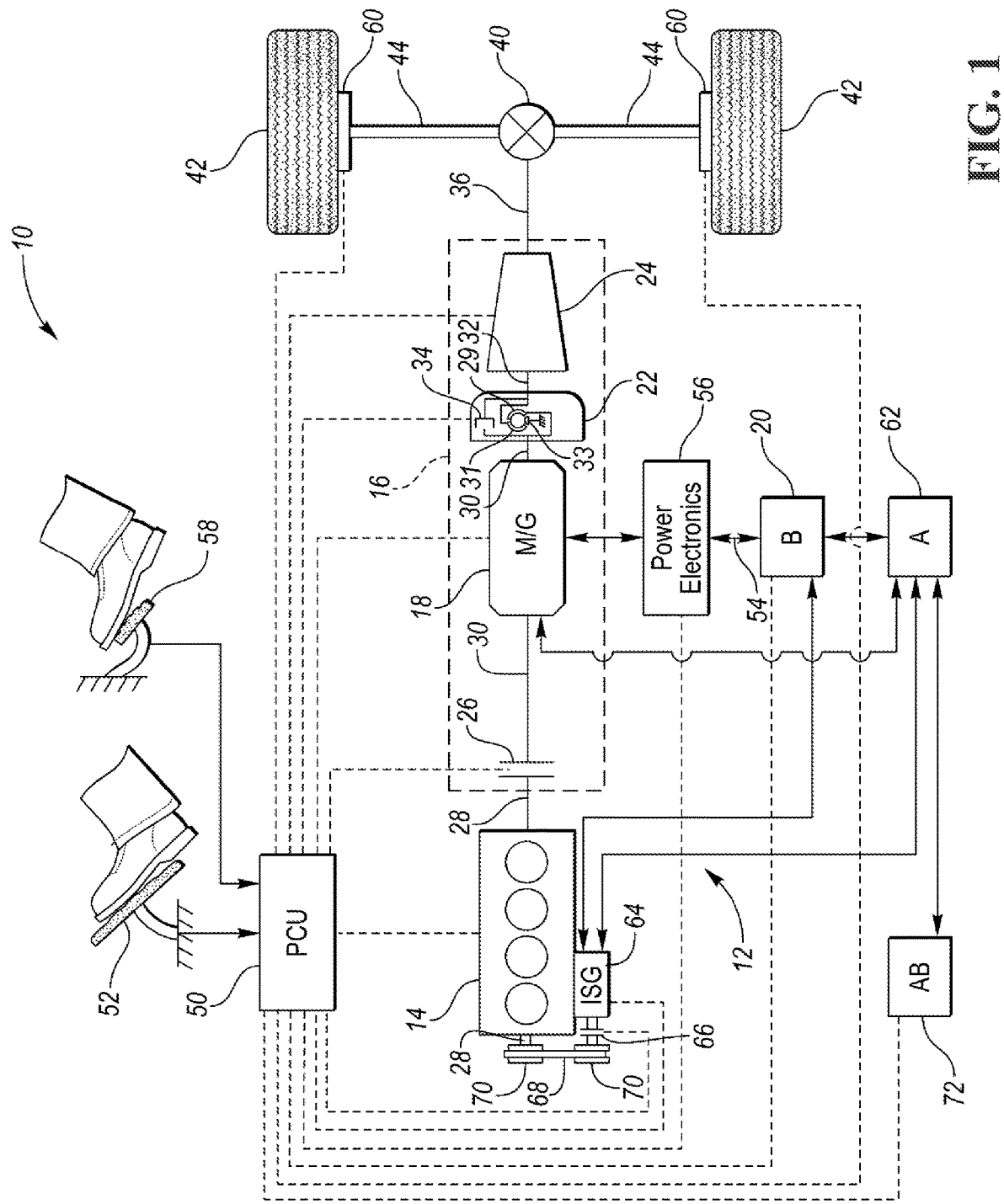
FIG. 1 is a schematic illustration of a representative powertrain of a hybrid electric vehicle.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24. The powertrain 12 includes power generating components (i.e., engines or electric motors) and the drivetrain. The drivetrain is the group of components that deliver power to the driving wheels, excluding the power generating components. In contrast, the powertrain 12 is considered to include both the power generating components and the drivetrain.

The engine 14 and the M/G 18 are both drive sources or powerplants for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The disconnect clutch 26 may be referred to as the engine disconnect clutch. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller 29 fixed to M/G shaft 30, a turbine 31 fixed to a transmission input shaft 32, and a stator 33 that is grounded such that it does not rotate. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be configured to transition between an opened (or disconnected) state, a closed (or locked) state, and a slipping state. The rotation of the impeller 29 and the turbine 31 are synchronized when the torque converter bypass clutch 34 is in the closed or locked state. The rotation of the impeller 29 and the turbine 31 are non-synchronized when the torque converter bypass clutch 34 is in the open state or the slipping state The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles or half shafts 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example. In another alternative embodiment, the M/G 18 may be disposed between the gearbox 24 and the differential 40. In such an alternative embodiment, where the M/G 18 is disposed between the gearbox 24 and the differential, one or more launch clutches or a torque converter may be disposed between the engine and the gearbox 24.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating the engine 14 to provide a desired torque, operating the M/G 18 to provide torque to the wheels or charge battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine power and/or torque through the disconnect clutch 26 to the M/G 18, and then from the M/G 18 to shaft 30 (i.e., the impeller of the torque converter 22) and through the torque converter 22 and gearbox 24. The M/G 18 may assist the engine 14 by providing additional power and/or torque to turn the shaft 30 (i.e., the impeller of the torque converter 22). This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative power and/or torque to the shaft 30 (i.e., the impeller of the torque converter 22). This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an opened state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should also be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 2:
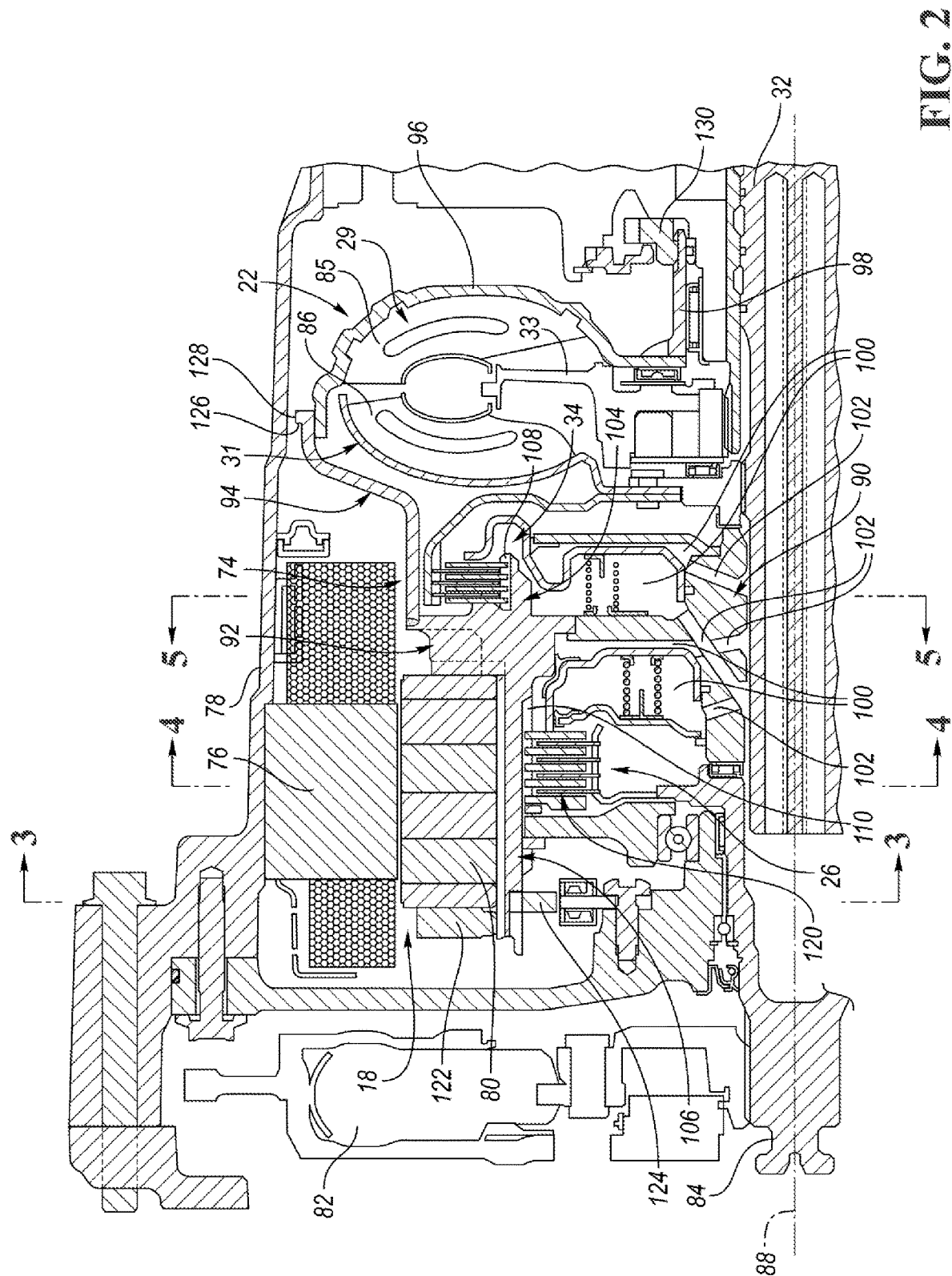
FIG. 2 is a cross-sectional view of a portion of the powertrain that includes the electric machine and the torque converter.
Figure 3:
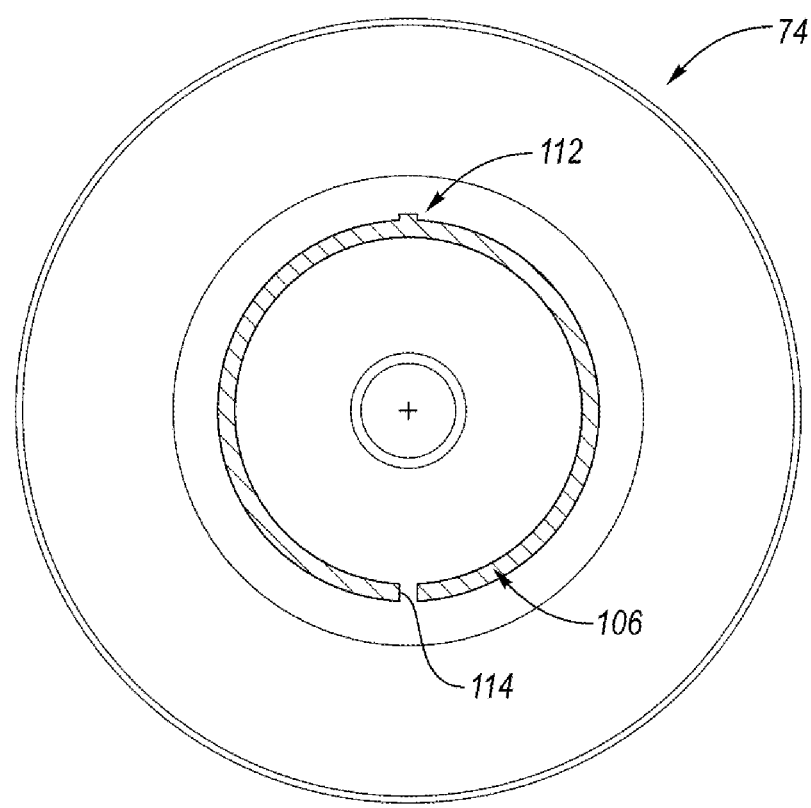
FIG. 3 is a cross-sectional view taken along line 3-3 in FIG. 2 of a weldment that is a subcomponent of the powertrain.
Figure 4:
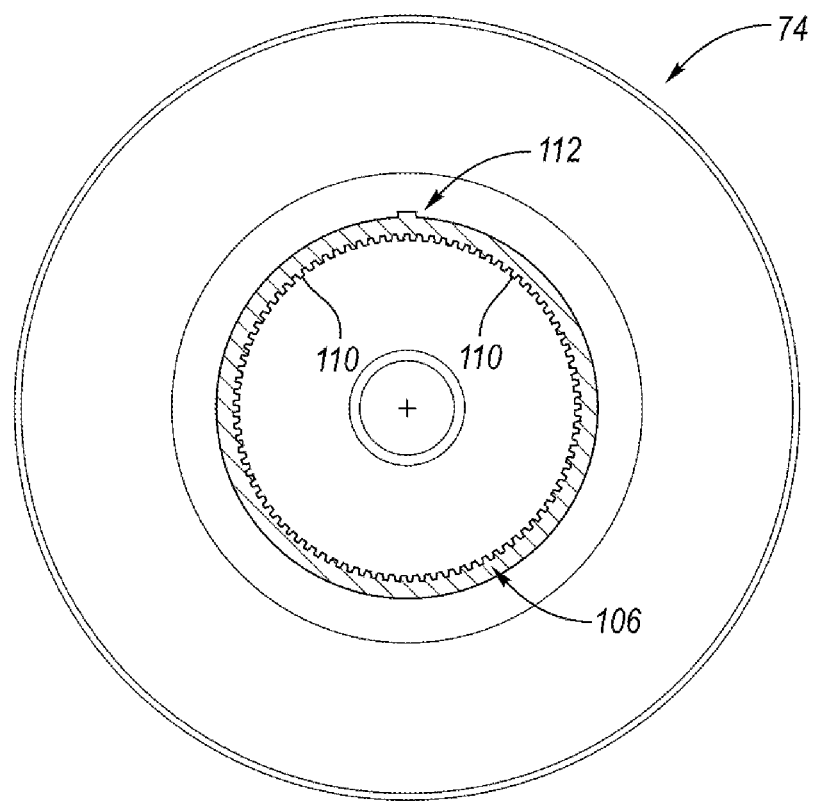
FIG. 4 is a cross-sectional view taken along line 4-4 in FIG. 2 of the weldment.
Figure 5:
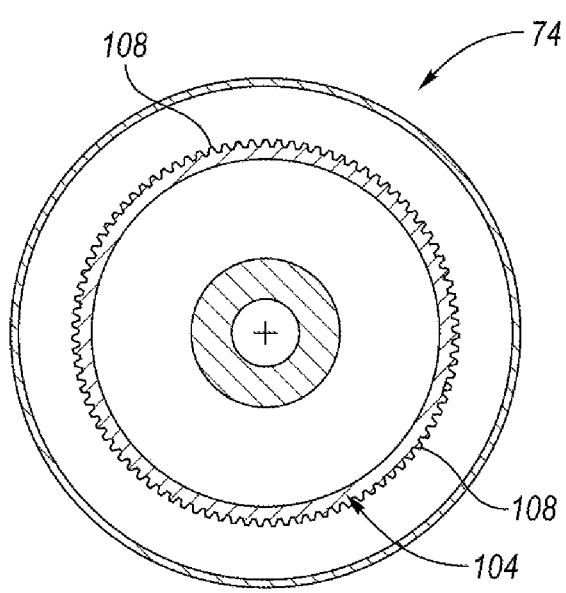
FIG. 5 is a cross-sectional view taken along line 5-5 in FIG. 2 of the weldment.

Referring to FIGS. 2-5, a cross-sectional view of a portion of the powertrain 12 that includes the M/G 18 and the torque converter 22 is illustrated in FIG. 2, while various cross-sections of a weldment 74 that is a subcomponent of the powertrain 12 are illustrated in FIGS. 3-5. The M/G 18 includes a stator 76 that is secured to a housing 78 and a rotor 80 that is secured to the weldment 74. The crankshaft 28 (not shown in FIG. 2) may be connected to the disconnect clutch 26 via a torsional damper 82 and shaft 84. The portion of the powertrain 12 illustrated in FIG. 2 may be referred to as the front module. The input or input shaft to the front module may be the crankshaft 28, via the torsional damper 82 and shaft 84. Alternatively, shaft 84 may be referred to as the input shaft to the front module. The output or output shaft of the front module may be the transmission input shaft 32. The transmission input shaft 32 may be secured to the turbine 31 such that rotation of the transmission input shaft 32 and turbine 31 are synchronized. The impeller 29 includes impeller blades 85 and the turbine 31 includes turbine blades 86.

The weldment 74 is configured to rotate about axis 88 and to transfer power from the crankshaft 28 (or shaft 84) and the rotor 80 of the M/G 18 to the impeller 29. Ultimately, the weldment 74 is configured to transfer power and torque generated by the engine 14 and/or the M/G 18 to the torque converter 22. The weldment 74 includes a first hub 90, a second hub 92, a torque converter cover 94 (which also may be referred to as a hub), an impeller housing 96 (which also may be referred to as a hub), and a third hub 98. The weldment 74 may be formed via securing the adjacent components of the first hub 90, second hub 92, torque converter cover 94, impeller housing 96, and third hub 98 to each other. More specifically, the adjacent components of the first hub 90, second hub 92, torque converter cover 94, impeller housing 96, and third hub 98 may be secured to each other via welding.

The first hub 90 is configured to rotate about axis 88 and about shaft 32. The first hub 90 at least partially defines fluid chambers 100 that are configured to receive fluid for engaging and disengaging the disconnect clutch 26 and the torque converter lock-up clutch 34. The first hub 90 defines channels 102 that are configured to route fluid into and out of the fluid chambers to engage and disengage the disconnect clutch 26 and the torque converter lock-up clutch 34. The torque converter lockup clutch 34 may more specifically be configured to rotatably connect and disconnect the turbine 31 to and from the weldment 74, which in turn connects and disconnects the turbine 31 to and from the impeller 29 via the weldment 74. The disconnect clutch 26 may more specifically be configured to rotatably connect and disconnect the crankshaft 28, via the torsional damper 82 and shaft 84, to and from the weldment 74, which in turn connects and disconnects the crankshaft 28 to and from the impeller 29 via the weldment 74.

The second hub 92 is secured to the first hub 90 and is disposed radially outward from the first hub 90 relative to the axis 88. The second hub 92 has a first protrusion 104 and a second protrusion 106 that extending axially outward in opposing directions relative to the axis 88. The first protrusion 106 defines a first set of splines 108. The second protrusion 106 defines a second set of splines 110. The second protrusion 108 also defines a first key or first keyway 112 (please note that 112 is a key in the illustrated embodiment) and a second key or second keyway 114 (please note that 114 is a keyway in the illustrated embodiment).

The torque converter lockup clutch 34 includes a first set of friction plates 118 that are secured to the first protrusion 104 via the first set of splines 108. More specifically, the first set of friction plates 118 may include friction plates that are secured to the first protrusion 104 via the first set of splines 108 and friction plates that are secured to the turbine 31, where the friction plates that are secured to the first protrusion 104 are interleaved with the friction plates that are secured to the turbine 31. The disconnect clutch 26 includes a second set of friction plates 120 that are secured to the second protrusion 106 via the second set of splines 110. More specifically, the second set of friction plates 120 may include friction plates that are secured to the second protrusion 106 via the second set of splines 110 and friction plates that are secured to the crankshaft 28 via the torsional damper 82 and shaft 84, where the friction plates that are secured to the second protrusion 106 are interleaved with the friction plates that are secured to the crankshaft 28. The rotor 80 of the M/G 18 is secured to the second protrusion 106 on an opposing side of the second protrusion 106 relative to the second set of friction plates 120. The rotor 80 includes a mating key or keyway that engages the first key or first keyway 112 such that rotation of the rotor 80 and the weldment 74 are synchronized. A retaining plate 122 is secured to the second protrusion 106 via an interference-fit or press-fit engagement. The retaining plate 122 engages an outer end of the rotor 80 to prevent axial movement (e.g., movement along axis 88) of the rotor 80. A rotor position sensor 124 is secured to the second protrusion 106. The rotor position sensor 124 includes a mating key or keyway that engages the second key or second keyway 114 such that rotation of the rotor position sensor 124 and the weldment 74 are synchronized.

The torque converter cover 94 is secured to the second hub 92 and is disposed radially outward from the second hub 92 relative to the axis 88. The impeller housing 96 is secured to the torque converter cover 94 and is disposed radially inward of the torque converter cover 94 relative to the axis 88. The impeller housing 96 is also disposed on an opposing side of the turbine blades 86 relative the second hub 92 and the torque converter cover 94. The impeller blades 85 are secured to an internal surface of the impeller housing 96. The torque converter cover 94 defines an edge surface 126 along outer radial periphery 128 of the torque converter cover 94. The edge surface 126 is substantially perpendicular to the axis 88 and is configured to engage a pressing tool to provide a reaction force during installation of the retaining plate 122. Substantially perpendicular may refer to any incremental angle between −10° and 10° from exactly perpendicular.

The third hub 98 is secured to the impeller housing 96, extends axially away (e.g., along axis 88) from the torque converter cover 94, and is disposed on an opposing side of the turbine blades 86 relative the second hub 92. The third hub 98 may be secured to a hydraulic fluid pump 130. More specifically, the third hub 98 may be secured to an impeller of a hydraulic fluid pump. The hydraulic fluid pump 130 may provide fluid to lubricate the components within the front module and/or the gearbox 24. The hydraulic fluid pump 130 may also provide fluid to actuate the torque converter lockup clutch 34, the disconnect clutch 26, and the clutches within the gearbox 24.

It should be understood that the designations of first, second, third, fourth, etc. for clutches, sets of splines, protrusions, hubs, keyways, keys, sets of frictions plates, or any other component, state, or condition described herein may be rearranged in the claims so that they are in chronological order with respect to the claims.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:
1. A vehicle comprising:
an engine having a crankshaft;
an electric machine having a rotor;
a torque converter having an impeller and a turbine, the impeller and turbine each having blades;
a weldment configured to rotate about an axis and to transfer power from the crankshaft and the rotor to the impeller, the weldment having
a first hub,
a second hub secured to the first hub and disposed radially outward from the first hub relative to the axis, the second hub having first and second protrusions extending axially outward in opposing directions relative to the axis, the first and second protrusions defining first and second sets of splines, respectively, and the second protrusion defining a key,
a torque converter cover secured to the second hub and disposed radially outward from the second hub relative to the axis, an impeller housing secured to the torque converter cover, disposed radially inward of the torque converter cover relative to the axis, and disposed on an opposing side of the turbine blades relative the second hub and torque converter cover, wherein the impeller blades are secured to an internal surface of the impeller housing, and a third hub secured to the impeller housing, extending axially away from the torque converter cover relative to the axis, and disposed on an opposing side of the turbine blades relative the second hub;

an engine disconnect clutch configured rotatably connect and disconnect the crankshaft to and from the weldment; and a torque converter lockup clutch configured to rotatably connect and disconnect the turbine to and from the weldment.

2. The vehicle of claim 1, wherein the torque converter lockup clutch includes a first set of friction plates that are secured to the first protrusion of the second hub via the first set of splines.

3. The vehicle of claim 2, wherein the engine disconnect clutch includes a second set of friction plates that are secured to the second protrusion of the second hub via the second set of splines.

4. The vehicle of claim 3, wherein the rotor is secured to the second protrusion of the second hub on an opposing side of the second protrusion relative to the second set of friction plates, and wherein the rotor engages the key such that rotation of the rotor and the weldment are synchronized.

5. The vehicle of claim 4 further comprising a retaining plate that is secured to the second protrusion of the second hub via an interference-fit engagement, wherein the retaining plate engages the rotor to prevent axial movement of the rotor relative to the axis.

6. The vehicle of claim 5, wherein the torque converter cover defines an edge surface along outer radial periphery of the torque converter cover, wherein the edge surface is substantially perpendicular to the axis and is configured to engage a pressing tool to provide a reaction force during installation of the retaining plate.

7. The vehicle of claim 6, wherein the second protrusion of the second hub defines a keyway.

8. The vehicle of claim 7 further comprising a rotor position sensor, and wherein the rotor position sensor is secured to the second protrusion of the second hub and engages the keyway such that rotation of the rotor position sensor and the weldment are synchronized.

9. The vehicle of claim 8, wherein the third hub is secured to a hydraulic fluid pump.

10. A vehicle powertrain system:
a torque converter having an impeller and a turbine, the impeller and turbine each having blades;
an input shaft;
a weldment configured to rotate about an axis and to transfer power from the input shaft to the impeller, the weldment having
a hub having first and second protrusions extending axially outward in opposing directions relative to the axis, the first and second protrusions defining first and second sets of splines, respectively,
a torque converter cover secured to the hub and disposed radially outward from the hub relative to the axis, and
an impeller housing secured to the torque converter cover, disposed radially inward of the torque converter cover relative to the axis, and disposed on an opposing side of the turbine blades relative the hub and torque converter cover, wherein the impeller blades are secured to an internal surface of the impeller housing; and an output shaft secured to the turbine.

11. The vehicle powertrain system of claim 10 further comprising a torque converter lockup clutch configured to rotatably connect and disconnect the turbine to and from the weldment, wherein the torque converter lockup clutch includes a first set of friction plates that are secured to the first protrusion of the hub via the first set of splines.

12. The vehicle powertrain system of claim 11 further comprising a disconnect clutch configured rotatably connect and disconnect the input shaft to and from the weldment, wherein the disconnect clutch includes a second set of friction plates that are secured to the second protrusion of the hub via the second set of splines.

13. The vehicle powertrain system of claim 12, wherein the second protrusion of the hub defines a key.

14. The vehicle powertrain system of claim 13 further comprising an electric machine having a rotor, and wherein the rotor is secured to the second protrusion of the hub on an opposing side of the second protrusion relative to the second set of friction plates, and wherein the rotor engages the key such that rotation of the rotor and the weldment are synchronized.

15. The vehicle powertrain system of claim 14 further comprising a retaining plate that is secured to the second protrusion of the hub via an interference-fit engagement, wherein the retaining plate engages the rotor to prevent axial movement of the rotor relative to the axis.

16. The vehicle powertrain system of claim 15, wherein the torque converter cover defines an edge surface along outer radial periphery of the torque converter cover, wherein the edge surface is substantially perpendicular to the axis and is configured to engage a pressing tool to provide a reaction force during installation of the retaining plate.

17. The vehicle powertrain system of claim 14, wherein the second protrusion of the second hub defines a keyway.

18. The vehicle powertrain system of claim 17 further comprising a rotor position sensor, and wherein the rotor position sensor is secured to the second protrusion of the hub and engages the keyway such that rotation of the rotor position sensor and the weldment are synchronized.

19. A vehicle powertrain system comprising:
a torque converter having an impeller and a turbine; and
a weldment configured to rotate about an axis and to transfer power to the torque converter, the weldment having,
a first hub having first and second protrusions extending axially outward in opposing directions relative to the axis, the first and second protrusions defining first and second sets of splines, respectively, and the second protrusion defining a key, wherein first and second sets of splines are configured to engage first and second sets of friction plates, and wherein the key is configured to engage an electric machine rotor,
a torque converter cover secured to the first hub and disposed radially outward from the first hub relative to the axis, and
an impeller housing secured to the torque converter cover, disposed radially inward of the torque converter cover relative to the axis, and disposed on an opposing side of the turbine relative the first hub and torque converter cover.

20. The vehicle powertrain system of claim 19, wherein the weldment further comprises:
- a second hub secured to the first hub and disposed radially inward from the first hub relative to the axis; and
- a third hub secured to the impeller housing, extending axially away from the torque converter cover relative to the axis, and disposed on an opposing side of the turbine relative the first and second hubs.

\* \* \* \* \*